US012258753B2

(12) United States Patent
Sutton

(10) Patent No.: US 12,258,753 B2
(45) Date of Patent: Mar. 25, 2025

(54) HINGE JOINT

(71) Applicant: Humanihut Pty Ltd, Fullarton (AU)

(72) Inventor: Neale Sutton, Fullarton (AU)

(73) Assignee: HUMANIHUT PTY LTD, Fullarton (AU)

(*) Notice: Subject to any disclaimer, the term of this patent is extended or adjusted under 35 U.S.C. 154(b) by 430 days.

(21) Appl. No.: 17/627,515

(22) PCT Filed: Jun. 30, 2020

(86) PCT No.: PCT/AU2020/000058
§ 371 (c)(1),
(2) Date: Jan. 14, 2022

(87) PCT Pub. No.: WO2021/007607
PCT Pub. Date: Jan. 21, 2021

(65) Prior Publication Data

US 2022/0282473 A1 Sep. 8, 2022

(30) Foreign Application Priority Data

Jul. 17, 2019 (AU) ................................ 2019/206038

(51) Int. Cl.
*E04B 1/34* (2006.01)
*B65D 88/52* (2006.01)
(Continued)

(52) U.S. Cl.
CPC .......... *E04B 1/3445* (2013.01); *B65D 88/522* (2013.01); *E05D 1/02* (2013.01); *E05Y 2800/12* (2013.01); *E05Y 2900/132* (2013.01)

(58) Field of Classification Search
CPC .... E04B 1/3445; E04B 1/34884; E04B 1/344; E04B 1/34384; E04B 1/34315;
(Continued)

(56) References Cited

U.S. PATENT DOCUMENTS 2,210,652 A 8/1940 Dennett
2,912,049 A 11/1959 Kuyper
(Continued)

FOREIGN PATENT DOCUMENTS

EP 0666401 A1 8/1995
KR 20140003906 A 1/2014
(Continued)

OTHER PUBLICATIONS

International Search Report and Written Opinion for PCT/AU2020/000058, entitled: A Hinge Joint, dated Aug. 25, 2020.
(Continued)

*Primary Examiner* — Beth A Stephan
(74) *Attorney, Agent, or Firm* — Hamilton, Brook, Smith & Reynolds, P.C.

(57) ABSTRACT

A hinge joint is disclosed. In an embodiment, the hinge joint includes a first hinge component, a second hinge component and a flexible member linking the first and second hinge components to support relative movement of the first hinge component and the second hinge component between an abutting relationship and a non-abutting relationship. A foldable shelter including a hinge joint according to an embodiment of the disclosure is also disclosed.

11 Claims, 8 Drawing Sheets

(51) Int. Cl.
*E04B 1/344* (2006.01)
*E05D 1/02* (2006.01)

(58) Field of Classification Search
CPC ......... E05D 1/02; E05D 1/04; E05Y 2800/12; E05Y 2900/13; B65D 88/522; E06B 3/70
See application file for complete search history.

(56) References Cited

U.S. PATENT DOCUMENTS

| | | | |
|---|---|---|---|
| 4,214,669 A | 7/1980 | McQuiston | |
| 5,129,441 A | 7/1992 | Leist | |
| 9,169,633 B2 | 10/2015 | DiGregory | |
| 2018/0179751 A1* | 6/2018 | Krohmer | E04B 1/3205 |

FOREIGN PATENT DOCUMENTS

| | | |
|---|---|---|
| SE | 524090 C2 | 6/2004 |
| WO | WO 2019155122 A1 | 8/2019 |

OTHER PUBLICATIONS

Humanihut Launch—Channel 9 News Nov. 25, 2015 [viewed on internet on Aug. 7, 2020], <URL:https://www.youtube.com/watch?v=C3NEVkGfcg4> published Nov. 25, 2015.

HumaniHut Shelter System [retrieved from internet on Aug. 7, 2020], <URL: http://www.citcusa.com/wp-content/uploads/2016/08/Tech-details-7slides.pdf> published Aug. 2016.

* cited by examiner

HINGE JOINT

This application is the U.S. National Stage of International Application No. PCT/AU2020/000058, filed Jun. 30, 2020, which designates the U.S., published in English, and claims priority under 35 U.S.C. § 119 or 365 (c) to Australian Application No. 2019206038 entitled "A Hinge Joint" filed on 17 Jul. 2019, the contents of which are to be taken as incorporated herein by this reference.

FIELD

The present disclosure broadly relates to a hinge joint. In a typical application, a hinge joint according to an embodiment of the disclosure may be used with a foldable structure, such as a foldable shelter for emergency accommodation.

BACKGROUND

Hinge joints are often used to join two or more members in a way which permits one member to move relative to the other member in a particular manner. As a result, hinge joints can be found in many everyday uses such as in building structures, containers, vehicles, and other systems.

One type of hinge joint is a "piano" type hinge joint including a first hinge component (such as a first leaf) fixedly attached to a first member, such as a door, and a second hinge component (such as a second leaf) fixedly attached to a second member, such as a door frame. In such a hinge, the first hinge component and the second hinge component often include one or more knuckles which are intermeshed to provide a channel for receiving a hinge pin therein about which the first hinge component and the second hinge component may rotate when in a connected arrangement.

Unfortunately, such pin based hinge joints may be susceptible to failure, such as by fracturing under certain circumstances. For example, if a deflecting force applied to one of the hinged members results in that member moving or deflecting relative to the other hinged member, a force or stress may be communicated or transferred to the hinge joint. Accordingly, as a result of the rigidity and construction of a pin based hinge joint it is possible that a deflecting force applied to the one of the hinged members may result in hinge joint fracturing. In the event of failure, and because of their complexity, pin based hinge joints may be difficult to replace and/or repair in the event of failure of one or more of the hinge components.

In addition, the configuration and limitations of pin based hinge joints means that they are not well suited to applications which require the hinge joint to provide a sealing effect between the movable members connected by the hinge joint as may be required in installations where the ingress of weather elements through the hinge joint is to be inhibited or reduced.

One approach for providing a hinge joint which allows for a connection between hinged members which allows one hinged member to move relative to the other hinged member in a particular manner, whilst also providing a sealing effect, involves locating and securing a one-piece continuous PVC extrusion between, for example, a door edge and a door frame to provide a sealing effect. One example of such a hinge is the "Centaflex" PVC hinge. In use, the PVC extrusion is screwed or otherwise affixed to the components to be joined as to form the joint therebetween thus making repair and or replacement difficult. Furthermore, such hinges do not address the problem caused by a deflecting force.

It would be desirable to provide an improved hinge joint which addresses at least some of the above deficiencies of current hinge joint arrangements.

SUMMARY

A first aspect of an embodiment of the disclosure provides a hinge joint including:

a first hinge component;

a second hinge component; and a flexible member linking the first and second hinge components to support relative movement of the first hinge component and the second hinge component between an abutting relationship and a non-abutting relationship.

In an embodiment, the flexible member is formed of an impermeable material.

In some embodiments, in the abutting relationship, the first hinge component and the second hinge component intermesh to form a desired alignment therebetween. In such an arrangement, the intermeshing of the first hinge component and the second hinge component resists independent deflection of the first hinge component or the second hinge component without communicating or transferring a load to the flexible member.

In an embodiment, the first hinge component may include a first region having a first profile and the second hinge component may include a second region having a second profile. In this embodiment, during movement of the first hinge component and the second hinge component to form the abutting relationship, the first profile and the second profile may progressively intermesh with each another. Preferably, the first region and the second region are shaped to progressively align the first hinge component and the second hinge component as they progressively intermesh to form the abutting relationship in the desired alignment.

In certain embodiments, one of the first or second profiles includes at least one projecting portion and the other of the first or second profiles includes at least one correspondingly shaped recess for receiving the at least one projecting portion to form the abutting relationship in which the first hinge component and the second hinge component are intermeshed.

In certain embodiments, the flexible member includes a strip including spaced apart and longitudinally extending first and second protuberant edges. The first hinge component may include a first channel for receiving the first protuberant edge and the second hinge component includes a second channel for receiving the second protuberant edge. Each channel may be shaped to retain a respective protuberant edge of the flexible member so as to support the flexible member to link the first hinge component and the second hinge component.

In an embodiment, the flexible member is slidably removable from the first and second hinge components lengthwise for replacement.

In certain embodiments, the hinge joint may further include a sealing member located to form a seal between the first region and the second region for inhibiting ingress of weather elements through the hinge when the first hinge component and the second hinge component are in the abutting relationship. In such an embodiment, when the first hinge component and the second hinge component are in the abutting relationship, the first hinge component and the second hinge component interoperate to substantially simultaneously compress the sealing member and the flexible member.

In an embodiment, the flexible member forms a first barrier for inhibiting ingress of weather elements through the hinge joint and the sealing member forms a second barrier for inhibiting ingress of weather elements through the hinged joint.

A hinge joint according to an embodiment may be used with a foldable sidewall of a foldable structure. Hence, another aspect of an embodiment of the disclosure provides a foldable sidewall including an upper wall member and a lower wall member which are joined using a hinge joint according to the above described first aspect.

Yet another aspect of an embodiment of the disclosure relates to a foldable structure including at least one pair of wall members which are joined using a hinge joint according to the above described first aspect. Examples of foldable structures include foldable transport containers, foldable shipping containers, or foldable accommodation, such as a foldable shelter.

Another aspect of the present disclosure provides a hinge joint including:

- a first hinge component including a first region having a first profile;
- a second hinge component including a second region having a second profile;
- a flexible member linking the first and second hinge components to support relative movement of the first hinge component and the second hinge component between an abutting relationship and non-abutting relationship;
- a sealing member located to form a seal between the first region and the second region, said sealing member for inhibiting ingress of weather elements through the hinge joint when the first hinge component and the second hinge component are in the abutting relationship;
- wherein during movement of the first hinge component and the second hinge component to form the abutting relationship, the first profile and the second profile progressively intermesh with each another;
- wherein the first profile and the second profile are shaped to progressively align the first hinge component and the second hinge component during movement to form the abutting relationship to form a desired alignment therebetween; and
- wherein when the first hinge component and the second hinge component are in the abutting relationship, the first profile and the second profile interoperate to compress the sealing member.

Certain embodiments of the present disclosure thus provide a housing system including a shelter module including at least one rigid side wall hingedly connected to a rigid roof and/or a rigid floor using a hinge joint according to the first aspect described above, wherein the shelter modules are foldable to a substantially flat configuration.

BRIEF DESCRIPTION OF THE DRAWINGS

Embodiments of the present invention will be discussed with reference to the accompanying drawings wherein.

DESCRIPTION OF EMBODIMENTS

FIGS. 1 to 6 show a hinge joint 10 according to an embodiment of the disclosure. The hinge joint 10 includes a first hinge component 12, a second hinge component 14, and a flexible member 16 linking the first hinge component 12 and second hinge component 14 to support relative movement of the first hinge component 12 and the second hinge component 14 between abutting relationship and non-abutting relationship.

In the illustrated embodiment, the flexible member 16 includes a single piece extrusion formed from an impermeable material such as Elastollan® thermoplastic polyurethane (TPU). However, it is to be appreciated that the flexible member 16 may be formed from other suitable materials or construction methods. In this respect, other suitable materials may include high density polyethylene (HDPE), natural rubber, synthetic rubber, waterproof fabric (such as a natural or synthetic fabric laminated to or coated with a waterproofing material), and other polymeric materials, such as polyvinyl chloride (PVC), linear low-density polyethylene (LLDPE), polytetrafluoroethylene (PTFE), synthetic fiber, and polypropylene (PP).

In the present case, the first hinge component 12 and the second hinge component 14 include extruded sections, such as extruded aluminium sections, which are affixed, retained, or otherwise secured to a respective structural element, shown here as panels P1, P2, such as a wall panel. However, it is possible that other arrangements and materials could be used. For example, it is possible that the first hinge component 12 and/or the second hinge component 14 could be an integrally formed structural element, such as a door, a frame, a wall, a desk, a shelf, a hatch, a shutter, a panel, a partition or a cover, as non-limiting examples.

Figure 4:
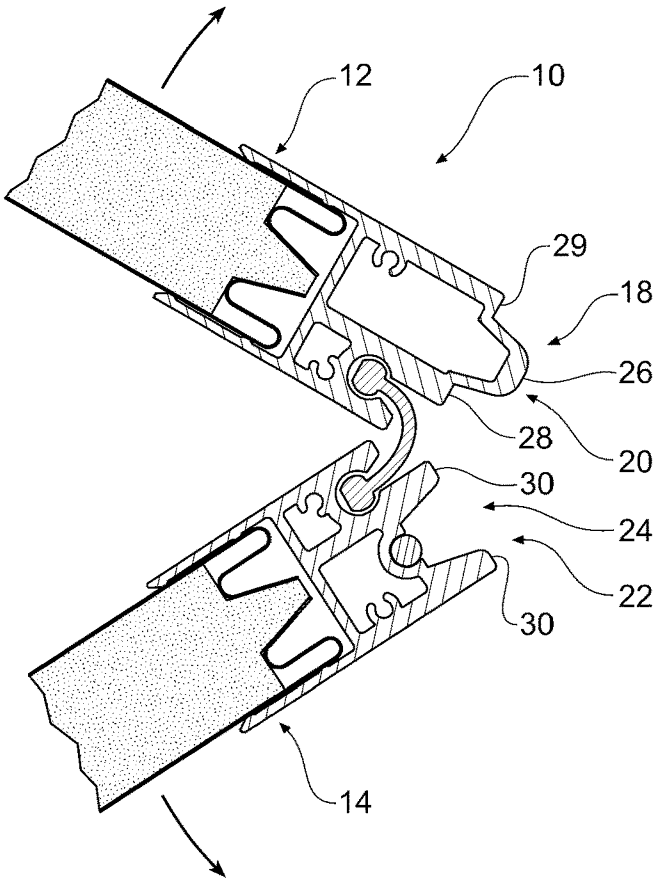
FIG. 4 is an end sectional view of the hinge joint shown in FIG. 1 with the first hinge component and the second hinge component partially hinged open in non-abutting relationship.
Figure 5:
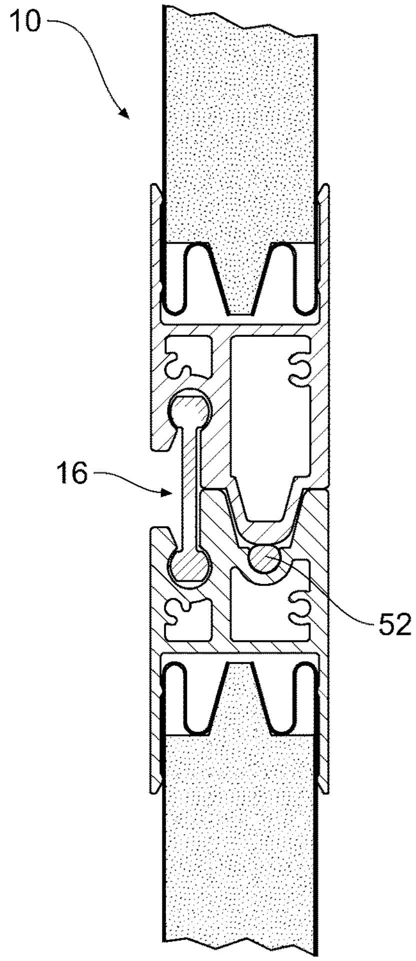
FIG. 5 is an end sectional view of the hinge joint shown in FIG. 1 with the first hinge component and the second hinge component hinged close in abutting relationship.

As shown in FIG. 4, the first hinge component 12 includes a first region 18 having a first profile 20, and the second hinge component 14 includes a second region 22 having a corresponding profile 24. As will be explained in more detail following, during movement to form the abutting relationship, the first profile 20 and the second profile 24 progressively intermesh with one another to form a desired alignment in the form of a desired positional relationship between the first profile 20 and the second profile 24.

The first profile 20 includes a projecting portion 26 which, in the present case, continuously extends along the length of the first hinge component 12. However, in some embodiments, it is possible that plural spaced apart projecting portions are provided in the form of a discontinuous arrangement of projecting portions.

The projecting portion 26 shown here tapers inwardly (i.e. narrows) as it projects outwardly from the first region 18. A first shoulder 28 depends from a first edge of the projecting portion 24 in the direction of the flexible member 16. A second shoulder 29 depends from a second edge of the projecting portion 24 in a direction away from the flexible member 16.

Figure 3:
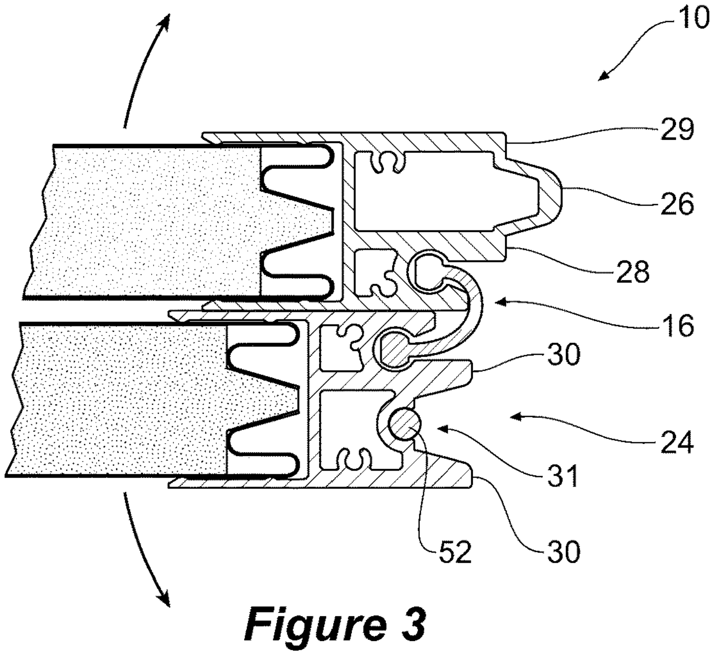
FIG. 3 is an end sectional view of the hinge joint shown in FIG. 1 with the first hinge component and the second hinge component fully hinged open in non-abutting relationship.

As shown in FIG. 3, the second profile 24 includes a recess 31 which, in the present case, continuously extends along the length of the second hinge component 14. However, it is to be noted that in embodiments including plural spaced apart projecting portions, it is possible that plural spaced apart recesses are provided, such that each of the plural spaced apart recesses is shaped and located for receiving a respective one or more of the plural spaced apart projecting portions.

The recess 31 shown here widens as it depends outwardly from the first region 22. A pair of spaced apart edges 30 are disposed either side of the recess 31 for abutting with a respective shoulder 28, 29 when the first hinge component 12 and the second hinge component 14 are in abutting relationship.

Before continuing further, although the described embodiments involve a first profile 20 including one or more projecting portions 26 and a second profile 24 including one or more recesses 31, it is to be appreciated that other profile configurations arrangements may be possible. For example, in some embodiments, the first and second profiles 20, 24 include any suitable profile which, when the first hinge component 12 and the second hinge component 14 are in an abutting relationship, results in the first hinge component 12 and the second hinge component 14 intermeshing to form a designed alignment.

Figure 1:
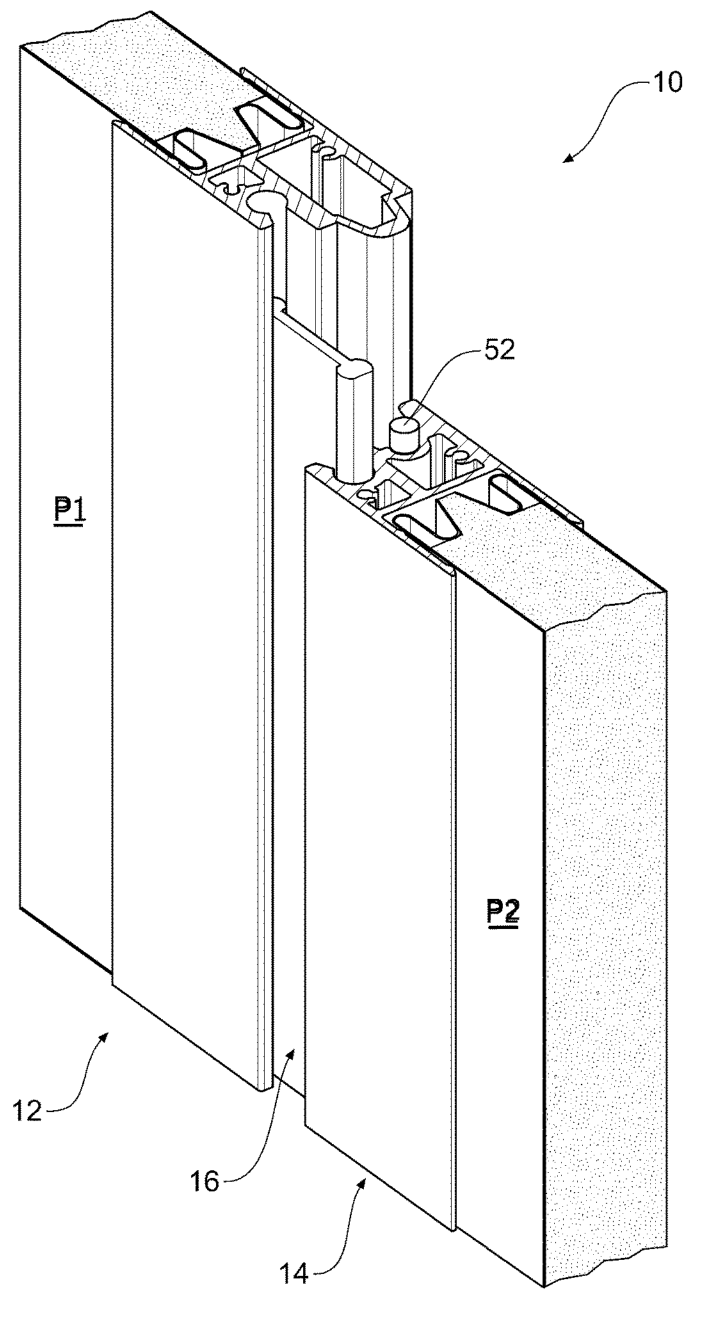
FIG. 1 is a perspective view of a hinge joint according to an embodiment of the disclosure.
Figure 2:
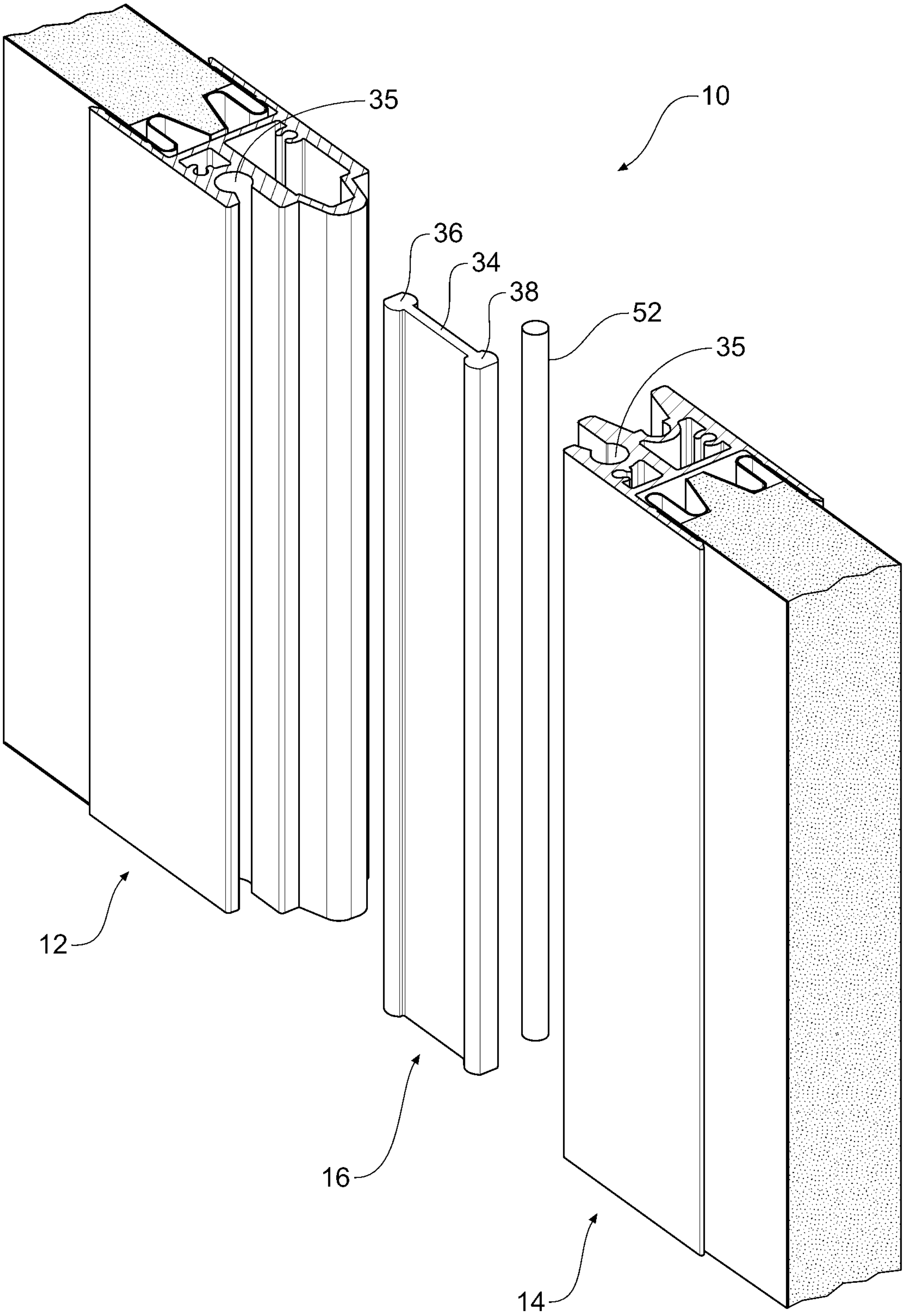
FIG. 2 is an exploded perspective view of the hinge joint shown in FIG. 1.

Turning now to FIG. 2, in the illustrated embodiment the flexible member 16 includes a strip-like section 34 and transversely spaced apart protuberant edges 36, 38 extending longitudinally.

Figure 7:
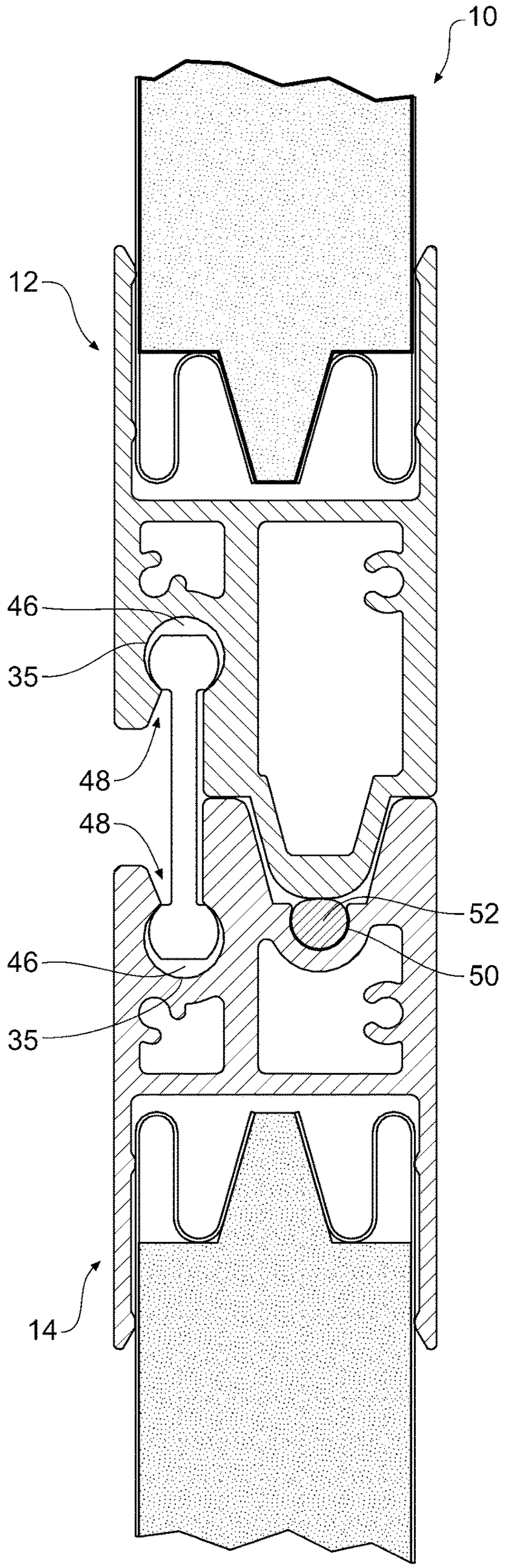
FIG. 7 is an end sectional view of the hinge joint shown in FIG. 1 with the first hinge component and the second hinge component hinged closed in an intermeshed abutting relationship.

As shown in FIG. 7, in the present case, each protuberant edge 36, 38 includes rounded surfaces 40, 42 and flat surface 44 arranged to form a truncated cylindrical-like cross-section. However, it will be appreciated that protuberant edges 36, 38 having other cross-section configurations may be used. Furthermore, although in the present case the strip-like section 34 shown here includes integrally formed protuberant edges 36, 38, it is possible that the protuberant edges 36, 38 are discrete elements which are affixed to edges of a separate strip to thereby form the flexible member 16 as an assembly.

Figure 6:
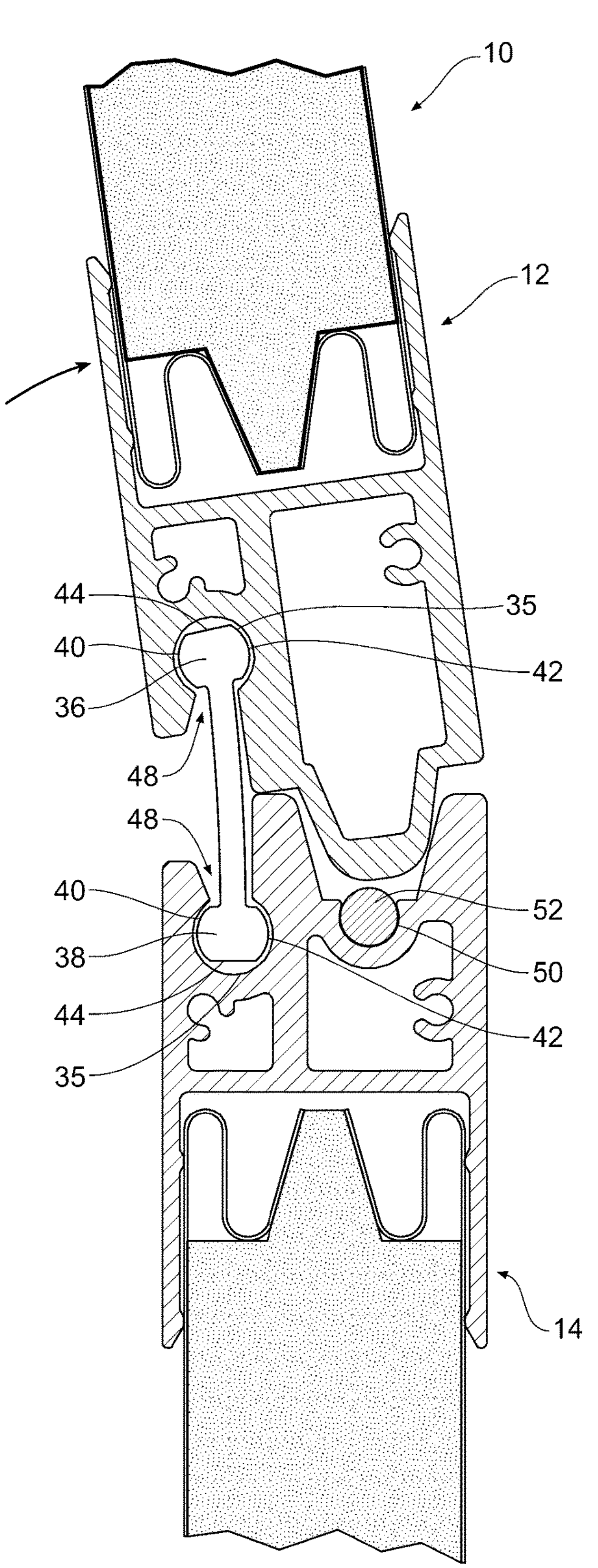
FIG. 6 is an end sectional view of the hinge joint shown in FIG. 1 with the first hinge component and the second hinge component in a partially intermeshed abutting relationship.

Returning now to FIG. 2, the first hinge component 12 and the second hinge component 14 include respective opposing channels 35 for receiving a respective protuberant edge 36, 38 of the flexible member 16. As shown in FIGS. 6 and 7, channels 35 are sized and configured to secure the flexible member 16 to link the first and second hinge components 12, 14 to support relative movement thereof between an abutting relationship and non-abutting relationship.

Preferably, the channels 35 are sized and configured to allow an extent of positional movement of the respective protuberant edge 36, 38 within the channel 35 whilst retaining the respective protuberant edge 36, 38 therein. In the present case, this is achieved using a channel 35 having an inner diametric region 46 for receiving a respective protuberant edge 36, 38 and a mouth 48 (ref. FIG. 6) which widens outwardly as it extends in the direction of the opposing channel 35. Such an arrangement also allows for the flexible member 16 to be slidably inserted and/or removed from the first hinge component 12 and the second hinge component 14 longitudinally as may be required for installation or replacement of the flexible member 16.

As shown in FIGS. 6 and 7, the inner diametric region 46 has a diameter which exceeds that of the protuberant edges 36, 38 to provide a clearance thereabouts. The mouth 48 forms, at the intersection with the diametric region 46, a slot having a width which exceeds that of the strip-like section 34 of the flexible member 16 so as to provide a clearance therebetween. The configuration of the clearance and the mouth 48, in combination, permits an extent of positional movement of the respective protuberant edge 36, 38, and thus the strip-like section 34, within the channel 35 whilst retaining the respective protuberant edge 36, 38 therein. An advantage of this arrangement is that it may allow for an extent of positional "play" in the hinge joint which does not require flexing the flexible member 16. Such "play" may assist with locating the projecting portion 26 in the desired alignment with the recess 31 when moving to the abutting relationship. When in the abutting relationship, the flexible member 16 may inhibit, or at least reduce, ingress of weather elements through the hinge joint 10 as the flexible member 16 may present an impermeable barrier to such ingress. For example, in some embodiments the flexible member 16 inhibits ingress of rain through the hinge joint 10, thus rendering the hinge joint waterproof in normal conditions of use.

In embodiments, a further improvement in the reduction or prevention of the ingress of weather elements through the hinge joint 10 is achieved by configuring the flexible member 16 so as to forcibly close a potential ingress path between outer surfaces (which, in this example, are surfaces 40, 42 and 44) of protuberant edges 36, 38 and the channel 35 by resiliently biasing the outer surfaces to bear against the channel 35. Such biasing may involve either compressing or tensioning the flexible member 16 between the first 20 and second profile 24 when the profiles 20, 24 are in abutting relationship. In FIG. 7, the depicted biasing involves the profiles 20, 24 applying a tension to the flexible member 16, when the profiles 20, 24 are in abutting relationship, to forcibly close a path which may otherwise exist about the mouth 48.

Returning now to FIGS. 3 to 5, movement of the first hinge component 12 and the second hinge component 14 from a non-abutting (ref. FIGS. 3 and 4) relationship to an abutting relationship aligns the projecting portion 26 with the recess 31 so as to allow the projecting portion 26 to progressively intermesh with the recess 31.

During movement of the first hinge component 12 and the second hinge component 14 from a non-abutting (ref. FIGS. 3 and 4) relationship to an abutting relationship it is to be noted that the configuration of the first profile 20 and the second profile 24 interact to guide the first hinge component 12 and the second hinge component 14 into the desired alignment as the profiles 20, 24 progressively intermesh.

Notably, and as shown in FIGS. 6 and 7, at a point where the projecting portion 26 is initially received by the recess 31, a relative initial difference in width between a head region of the projecting portion 26 extending into the recess 31 and a clearance between the spaced apart edges 30 (ref. FIG. 4) accommodates imprecise alignment and/or location of the projecting portion 26 therein. However, as the first hinge component 12 and the second hinge component 14 are moved into an abutting relationship, the width of the recess 31 narrows to steer the projecting portion 26 towards the abutting relationship. During this movement, as the projecting portion 26 moves towards the floor of the recess 31, and as the abutting relationship is formed, the projecting portion 26 wedges into, and so is intermeshed with, the recess 31 to thereby position the first hinge component 12 and the second hinge component 14 in the desired alignment.

Referring again to FIG. 6, in the present case, the second hinge component 14 provides a channel 50 extending along a floor region of the recess 31. The channel 50 shown here is shaped for receiving and retaining a sealing member 52. The sealing member 52 shown here is a high density closed cell EPDM sponge cord. However, it will be appreciated that other types of sealing materials and configurations may be used. Other suitable sealing members and configurations would be known to a skilled addressee.

As shown in FIG. 7, a portion of the sealing member 52 projects outwardly from the channel 50 from the floor of the recess 31 to permit contact with and compression by the projecting portion 26 of the first hinge component 12 when the projecting portion 26 is sufficiently located within the recess 31 so to be intermeshed therewith. When the first component 12 and the second hinge component 14 are so intermeshed, the hinge joint 10 may resist independent deflection of the first hinge component 12 or the second hinge component 16 which may otherwise give rise a shearing-type force between the first hinge component 12 and the second hinge component 14. An advantage of this arrangement is that it may prevent, or at least reduce, shearing-type forces which may reduce failure of the flexible member 16, and thus the hinge joint 10.

In addition to the above, and continuing now with reference to FIG. 7, in the intermeshed arrangement, the sealing member 52 is compressed between the projecting portion 26 and the recess 31 so as to form a sealing arrangement therebetween. Compressing the sealing member 52 in this manner is expected to improve the ability of sealing member to inhibit, or at least further reduce, ingress of weather elements through the hinge joint since it increases the contact area, and the contact force, between the sealing member 52 and the protrusion 26.

It is to be noted that although, in the present case, the sealing member 52 is located in a channel 50 extending along a floor region of the recess 31, it is not essential that a channel 50 be so provided as the sealing member 52 may be affixed, retained, or otherwise secured either at a different position on the second hinge component 14, or indeed on the first hinge component 12, to form a sealing arrangement between the first hinge component 12 and the second hinge component 14. That is, the sealing member 52 may be located at any location which permits compression of the sealing member 52 to be achieved and maintained between the first hinge component 12 and the second hinge component 14 when the first hinge component 12 and the second hinge component 14 are in an abutting relationship.

FIGS. 8 to 11 shown end views of embodiment of a foldable structure, shown here as a foldable shelter module 800. The shelter module 800 includes a floor 802, roof 804, and side walls 805. Each side wall 805 shown here includes hinge joints 10 of the type described above. The hinge joints 10 are located to allow an upper member (shown here as upper wall panel 806) and a lower member (shown here as lower wall panel 808) of the side wall 805 to articulate so that the walls 805 can be folded (in this example, inwardly) or unfolded (in this example, outwardly) to collapse or erect the foldable structure 800.

Figure 8:
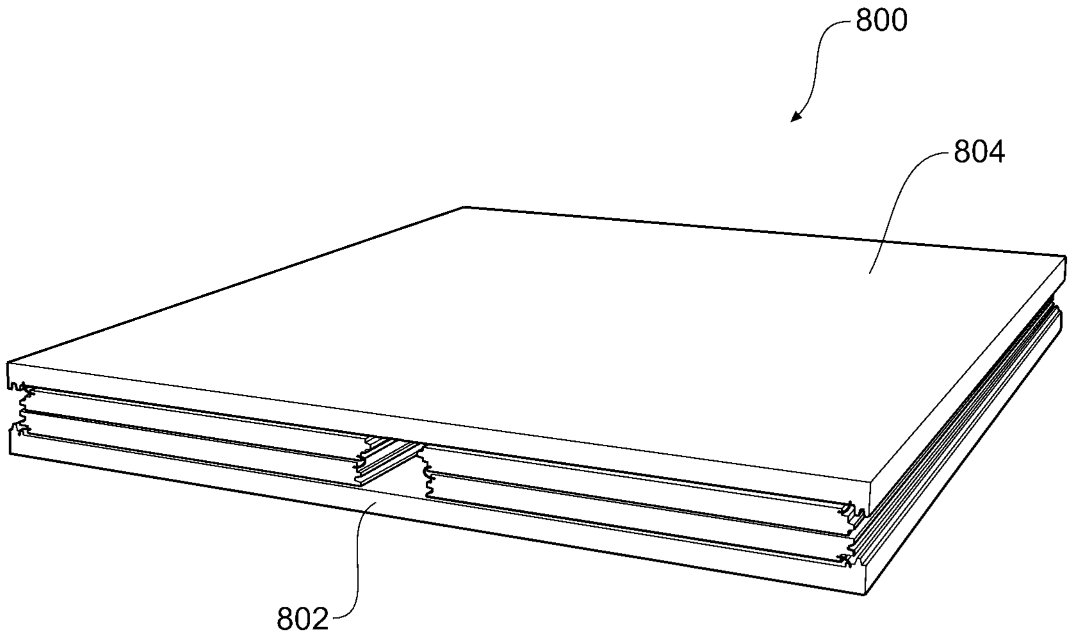
FIG. 8 is an end view of a foldable shelter including the hinge element shown in FIG. 1, with the foldable shelter in a folded configuration.
Figure 9:
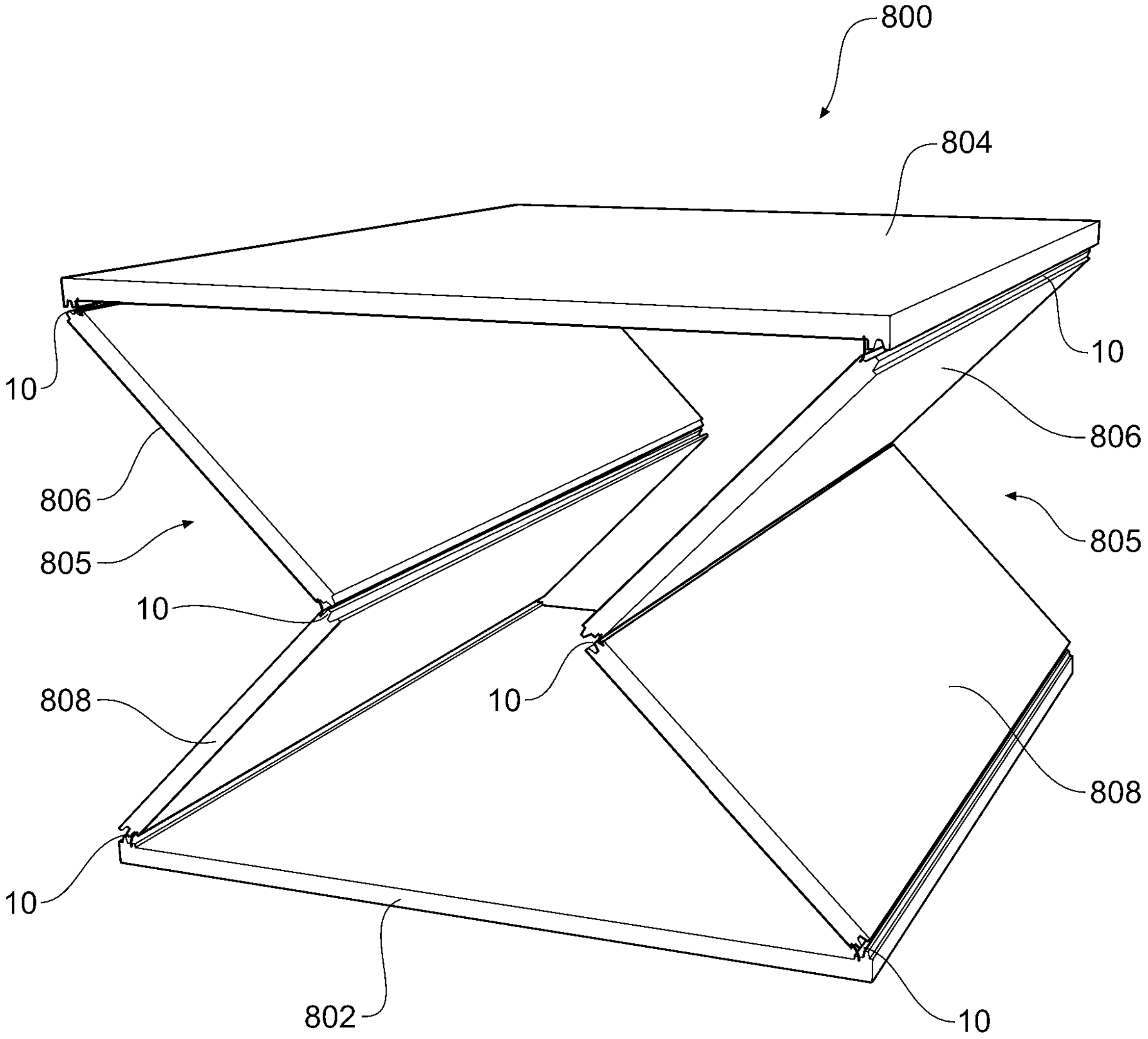
FIG. 9 is an end view of the foldable shelter shown in FIG. 1 with the foldable shelter in a partially erected configuration.
Figure 10:
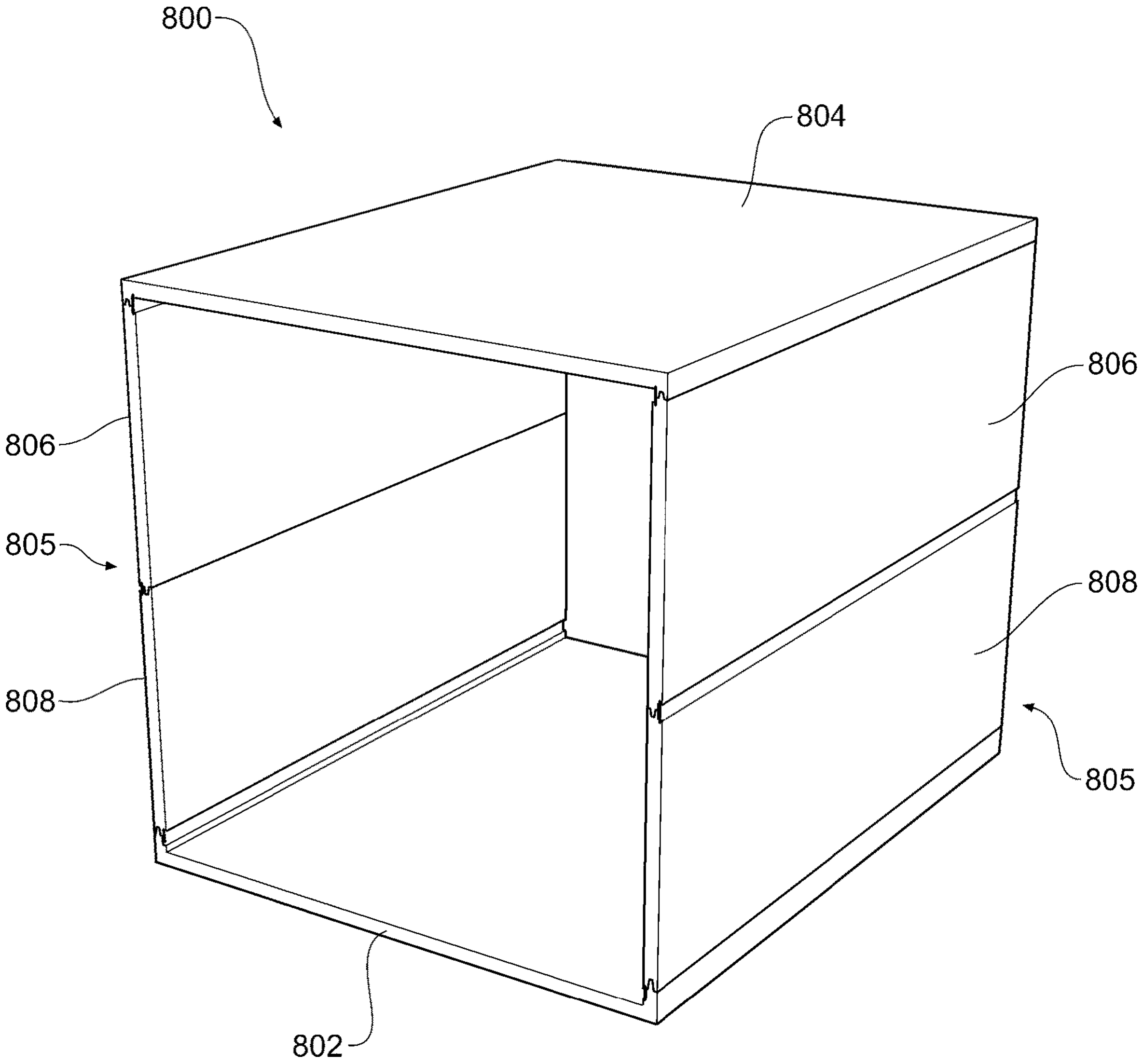
FIG. 10 is an end view of the foldable shelter shown in FIG. 1 with the foldable shelter in an erected configuration.

In the depicted arrangement, the hinge joints 10 are thus arranged to permit folding of the respective side walls 805 to or from a folded or collapsed configuration (ref. FIG. 8) from or to an erected configuration (ref. FIG. 10) via a partial erected state (ref. FIG. 9).

Erecting the foldable structure 800 may be achieved by raising or lifting the roof 804 upwardly relative to the floor 802 so that the side walls 805 unfold outwardly. During this movement, the link between the upper wall panel 806 and the lower wall panel 808 provided by the flexible member 16 (ref. FIG. 4) of a respective hinge joint 10, supports relative movement of the upper wall panel 806 and the lower wall panel 808. Indeed, in this example, the link provided by the flexible member 16 (ref. FIG. 4) assists with translating the upward movement of the roof 804 into outward movement of hinge joints 10 joining the upper wall panel 806 and the lower wall panel 808 as the side walls 805 unfold. Furthermore, as these hinge joints 10 move outwardly, and thus as the side walls 805 unfold, the first profile 20 (ref. FIG. 4) and the second profile 24 (ref. FIG. 4) progressively intermesh to guide the first hinge component 12 (ref. FIG. 4) and the second hinge component 14 (ref. FIG. 4) of each hinge joint 10 into a desired alignment in which the upper wall panel 806 and the lower wall panel 808 are vertically aligned. In the depicted embodiment, this alignment occurs without requiring any additional force intervention.

Figure 11:
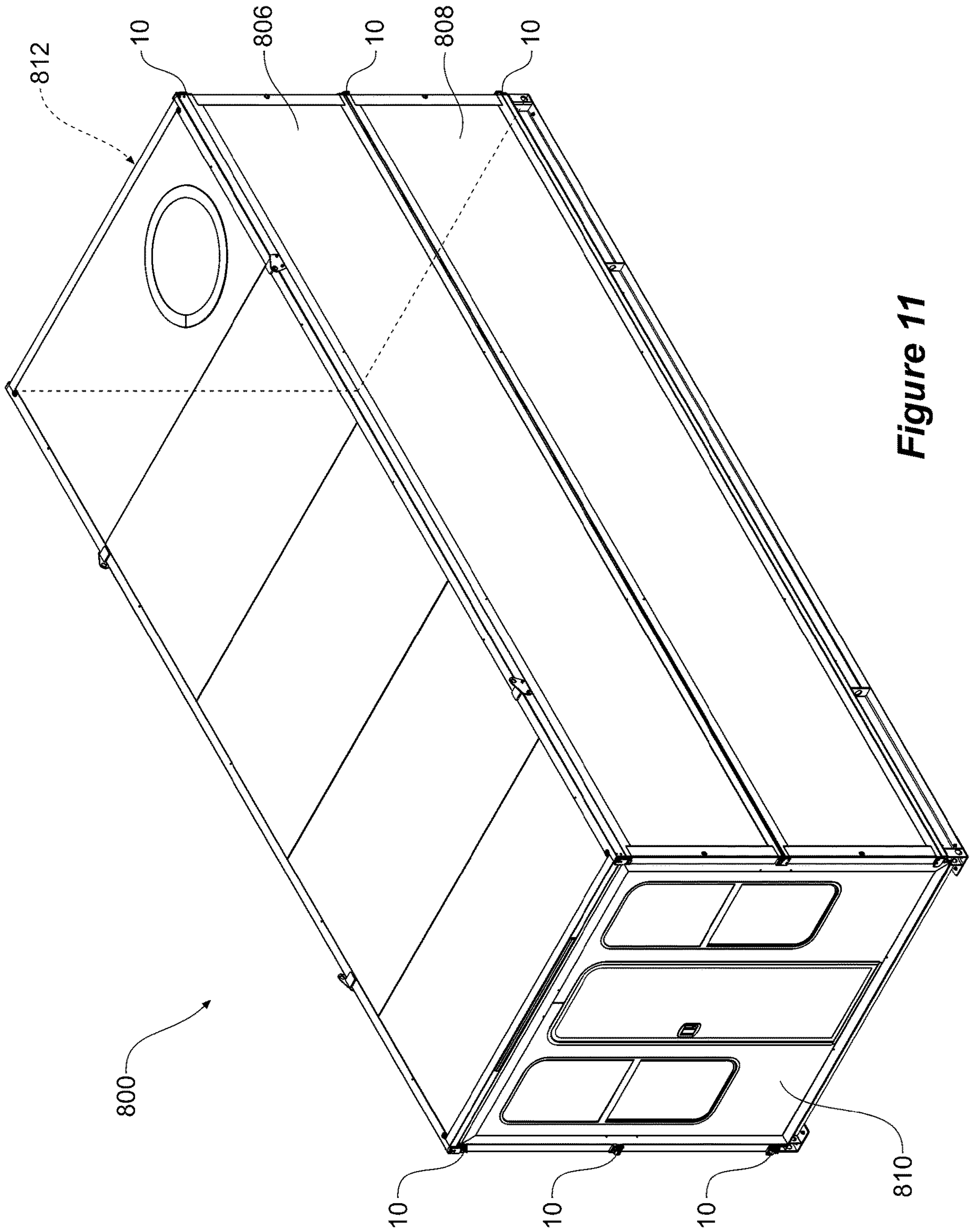
FIG. 11 is an isometric view of the foldable shelter shown in FIG. 1 in the erected configuration.

As shown in FIG. 11, when the shelter module 800 is erected, a front wall 810 and a rear wall 812 (shown dashed) are rotated or otherwise located into an erected position and located to prevent the side walls 805 from folding inwardly.

As shown in FIG. 11, in the above described erected configuration, the upper and lower wall panels 806, 808 are in a desired alignment (which in this case is a vertical alignment) and held in a rigid configuration by the front wall 810 and the rear wall 812. In this configuration, the above described intermeshing of the hinge components 10 resists independent deflection of the upper wall panel 806 and the lower wall panel 808. Furthermore, the arrangement of the flexible member 16 and the sealing member 52 inhibits, or at least further reduces, ingress of weather elements through the hinge joint 10.

Throughout the specification and the claims that follow, unless the context requires otherwise, the words "include" and "include" and variations such as "including" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A hinge joint including:

a first hinge component;

a second hinge component; and a flexible member formed of an impermeable material, the flexible member linking the first and second hinge components to support relative movement of the first hinge component and the second hinge component between an abutting relationship and a non-abutting relationship, the flexible member comprising a strip including spaced apart and longitudinally extending first and second protuberant edges, wherein the first hinge component includes a first channel having a first inner region for receiving and retaining the first protuberant edge and the second hinge component includes a second channel having a second inner region for receiving and retaining the second protuberant edge, such that the first and second inner regions are sized to receive and retain the first and second protuberant edges respectively with a clearance thereabouts, each of the clearances allowing at least an extent of positional movement of the protuberant edge retained therein during movement of the first hinge component and the second hinge component between the abutting and non-abutting relationship, wherein the first hinge component further includes a first region having a first profile and the second hinge component further includes a second region having a second profile such that during movement of the first hinge component and the second hinge component to form the abutting relationship, the first profile and the second profile progressively intermesh with each another, wherein one of the first or second profiles includes at least one projecting portion and the other of the first or second profiles includes at least one correspondingly shaped recess for receiving the at least one projecting portion to form the abutting relationship, and wherein in the abutting relationship, the first hinge component and the second hinge component intermesh to form a desired alignment therebetween.

2. A hinge joint according to claim 1 wherein, when in the abutting relationship, the intermeshing of the first hinge component and the second hinge component resists independent deflection of the first hinge component or the second hinge component.

3. A hinge joint according to claim 1 wherein the flexible member is slidably removable from the first and second hinge components lengthwise for replacement.

4. A hinge joint according to claim 1, further including a sealing member located to form a seal between the first region and the second region for inhibiting ingress of weather elements through the hinge joint when the first hinge component and the second hinge component are in the abutting relationship.

5. A hinge joint according to claim 4, wherein when the first hinge component and the second hinge component are in the abutting relationship, the first hinge component and the second hinge component interoperate to substantially simultaneously compress the sealing member and the flexible member.

6. A hinge joint according to claim 4, wherein the flexible member forms a first barrier for inhibiting ingress of weather elements through the hinge joint and the sealing member forms a second barrier for inhibiting ingress of weather elements through the hinged joint.

7. A hinge joint according to claim 1, wherein the first region and the second region are shaped to progressively align the first hinge component and the second hinge component during movement to form the abutting relationship so as to form the desired alignment therebetween.

8. A hinge joint according to claim 1 wherein the first hinge component and the second hinge component are arranged to form a side wall of a foldable structure.

9. A hinge joint according to claim 1 wherein the first hinge component and the second hinge component are secured to a side wall of a foldable structure.

10. A foldable structure including at least one pair of wall members which are joined using a hinge joint according to claim 1 so that each of the wall members can be folded or unfolded to collapse or erect the foldable structure.

11. A hinge joint according to claim 3 wherein the flexible member is slidably removable when the first hinge component and the second hinge component are in the abutting relationship.

* * * * *